United States Patent
Aizawa et al.

Patent Number: 5,179,456
Date of Patent: Jan. 12, 1993

[54] OPTICAL BIREFRINGENCE COMPENSATOR

[75] Inventors: Masanobu Aizawa, Yokohama; Shigekazu Yamauchi, Sagamihara; Jean F. Clerc, Machida; Shunji Takenaka, Hatano; Shinichi Hirose, Isehara, all of Japan

[73] Assignee: Stanley Electric Co., Ltd., Tokyo, Japan

[21] Appl. No.: 766,332

[22] Filed: Sep. 27, 1991

[30] Foreign Application Priority Data

Oct. 1, 1990 [JP] Japan .................. 2-263425

[51] Int. Cl.$^5$ .................... G02B 1/04; G02B 5/30
[52] U.S. Cl. .................... 359/73; 359/494; 359/500
[58] Field of Search .......... 359/73, 488, 494, 500, 359/490, 491, 492; 264/176.1

[56] References Cited

U.S. PATENT DOCUMENTS

| | | | |
|---|---|---|---|
| 3,447,857 | 6/1969 | McCartney | 359/500 |
| 4,385,806 | 5/1983 | Fergason . | |
| 4,617,207 | 10/1986 | Ueki et al. | 264/176.1 |
| 4,620,772 | 11/1986 | Sugimoto et al. . | |
| 4,701,028 | 10/1987 | Clere et al. . | |
| 4,759,611 | 7/1988 | Downey, Jr. . | |
| 5,042,924 | 8/1991 | Terasaki et al. | 359/500 |
| 5,061,042 | 10/1991 | Nakamura et al. | 359/500 |

FOREIGN PATENT DOCUMENTS

| | | |
|---|---|---|
| 0239433 | 9/1987 | European Pat. Off. . |
| 0298869 | 1/1989 | European Pat. Off. . |
| 1462978 | 1/1977 | United Kingdom . |

Primary Examiner—Martin Lerner
Attorney, Agent, or Firm—Nixon & Vanderhye

[57] ABSTRACT

A method of manufacturing an optical compensator sheet comprising the steps of providing a sheet of ionomer, which ionomer is bridged with sodium or magnesium ions, stretching said sheet of ionomer along one direction in the plane of sheet, so as to generate uni-axial optical anisotropy of predetermined amount having an optical axis along the stretched direction, sandwiching said stretched sheet of ionomer between a pair of substrates, putting said sandwiched sheet in an evacuatable heat-resisting bag, evacuating and sealing said bag, loading said bag in an autoclave furnace and applying heat and pressure to said sheet in said autoclave furnace at a temperature not less than the melting point of the sheet. The stretched sheet has a positive optical anisotropy along the stretched direction. The sheet after heat and pressure treatment has a negative optical anisotropy along the normal to the sheet.

12 Claims, 3 Drawing Sheets $nx = ny < nz$ $nz \leq nx < ny$ $nz \leq ny < nx$ $nx = ny > nz$

OPTICAL BIREFRINGENCE COMPENSATOR

BACKGROUND OF THE INVENTION

1. Field of the Invention

This invention relates to an optical compensator, and more particularly to an optical compensator sheet having a negative type optical anisotropy in which the refractive index normal to the plane of sheet is smaller than those in the plane of sheet.

2. Description of the Related Art

It is known that when a film of polymer material is stretched in one direction, the optical refractive index in the stretched direction becomes larger than the optical indices in the directions perpendicular to the stretched direction.

For example, when a polycarbonate sheet is prepared, x and y axes are taken in the plane of sheet and z axis is taken in the direction perpendicular to the plane of sheet, the optical refractive indices along the respective actual directions are usually $n_x = n_y = n_z$. When this sheet is stretched in x direction, the refractive index $n_x$ in x direction, which is the stretched direction, becomes larger than the refractive indices $n_y$ and $n_z$ in y and z directions, which are the directions perpendicular to the stretched direction, $n_x > n_y = n_z$.

In a liquid crystal display device utilizing homeotropic orientation, optical compensation is required.

When liquid crystal molecules are homeotropically orientated normal to a substrate, the refractive index of the liquid crystal layer in the direction perpendicular to the substrate becomes higher than the refractive indices in directions parallel to the substrate, to show a positive optical anisotropy.

When an incident light ray comes obliquely to the substrate, the incident light ray is influenced by the optical anisotropy of the liquid crystal layer, thus, there occurs light leakage in the "OFF" state. This light leakage limits the viewing angle.

For improving the viewing angle of the liquid crystal display device, there is desired an optical compensator plate having a negative optical anisotropy for compensating the positive optical anisotropy of the liquid crystal layer.

However, it has been not easy to provide an optical compensator plate having a uniform negative optical anisotropy with an optic axis perpendicular to the plane of plate.

SUMMARY OF THE INVENTION

An object of this invention is to provide a method of manufacturing an optical compensator which can exhibit excellent optical compensation effect.

Another object of this invention is to provide an optical compensator sheet adapted for compensating the optical anisotropy of a liquid crystal cell in a liquid crystal display device.

According to one aspect of this invention, there is provided a method of manufacturing an optical compensator sheet comprising the steps of stretching a sheet of ion-containing polymer along one direction in the plane of sheet, thereby generating an optical anisotropy having a high refractive index axis in the stretched direction, sandwiching said sheet of ion-containing polymer between a pair of substrates and applying heat and pressure to said sheet of ion-containing polymer, thereby reducing the in-plane optical anisotropy in said sheet of ion-containing polymer.

The present inventors have found that an optical compensator sheet having a negative optical anisotropy which has a refractive index in the direction perpendicular to the plane of sheet smaller than the refractive indices in directions in the plane of sheet can be formed by utilizing an ion containing polymer as a raw material and performing predetermined treatment thereon. The distribution of the refractive index in the optical compensator sheet can be controlled depending on the degree of treatment.

It becomes possible to effectively compensate the optical anisotropy of a homeotropically oriented liquid crystal display by utilizing such an optical compensator sheet having an optical anisotropy in which the refractive indices in directions in the plane of sheet are larger than the refractive index in a direction perpendicular to the plane of sheet.

BRIEF DESCRIPTION OF THE DRAWINGS

FIG. 1A is a perspective view for illustrating the stretching step. FIG. 1B is a schematic cross section for illustrating the heating and pressing step.

FIG. 2A is a perspective view for illustrating a liquid crystal display device. FIG. 2B is a perspective view for illustrating refractive indices of a liquid crystal molecule. FIG. 2C is a perspective view for illustrating an optical compensator having desired optical characteristics for compensating the optical anisotropy of the liquid crystal. FIG. 2D is a conceptional diagram for illustrating another desired optical compensator.

FIG. 3A is a perspective view showing a structure of a liquid crystal display device. FIGS. 3B and 3C are graphs showing the dependency of the transmission on the viewing angle in various directions.

DESCRIPTION OF THE PREFERRED EMBODIMENTS

Preceding the description of the embodiments of this invention, description of the general homeotropic liquid crystal display device will be made first.

Figure 2A:
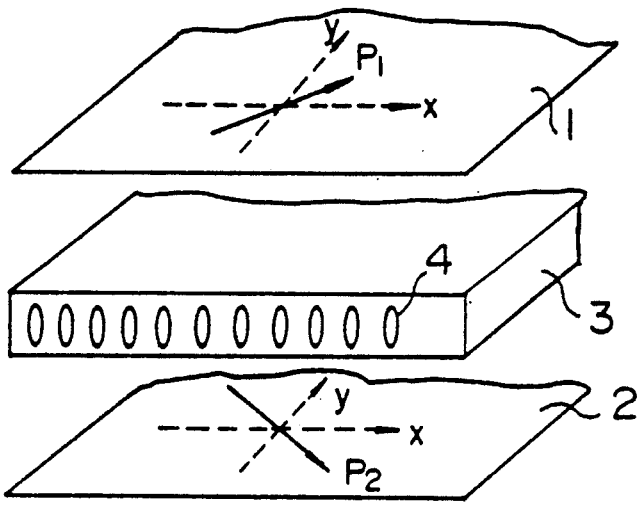
FIGS. 2A to 2D are diagrams for illustrating a prior art liquid crystal display device.

FIG. 2A schematically shows an example of a liquid crystal display device.

Between a pair of polarizer sheets 1 and 2 which have crossed polarization axes P1 and P2, a liquid crystal cell 3 is sandwiched to constitute a liquid crystal display device. In the liquid crystal cell 3, liquid crystal molecules 4 which are long in axial direction are contained. When these liquid crystal molecules 4 take the homeotropic orientation, in which molecules are orientated perpendicular to the substrates, the liquid crystal cell shows an optical anisotropy depending on the orientation of the liquid crystal molecules.

Figure 2B:
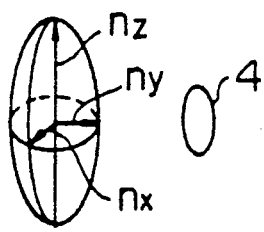

FIG. 2B schematically shows the distribution of refractive index of a liquid crystal layer.

When long axis of the liquid crystal molecules 4 are aligned normal to the substrate, the refractive index $n_z$ of the liquid crystal layer in the direction normal to the substrate becomes larger than the refractive indices $n_x$ and $n_y$ in other directions. Namely, a positive optical anisotropy is generated.

Even when polarizers 1 and 2 are orthogonally disposed, when the liquid crystal cell has such an optical anisotropy, and the viewing angle for seeing the liquid crystal cell is increased, there is generated off-plane component (z component) in the electric field components of the light ray, to cause leakage light. Thus, the viewing angle in which the liquid crystal cell can be clearly observed becomes narrow.

For widening the viewing angle, it is preferable to use an optical compensator of negative optical anisotropy for compensating the positive optical anisotropy of the liquid crystal.

Figure 2D:
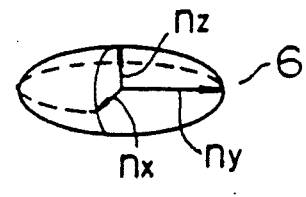
Figure 2D:
Figure 2C:
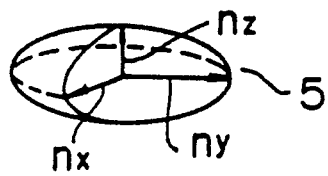

For achieving compensation of a liquid crystal cell having a positive optical anisotropy as shown in FIG. 2B, it is preferable to use an optical compensator having a negative optical anisotropy as shown in FIG. 2C. Namely, an optical compensator is desired which has large refractive indices $n_x$ and $n_y$ in directions parallel to the in-plane directions of the liquid crystal cell and a small refractive index $n_z$ in the direction perpendicular to the liquid crystal cell.

Even when such an optical compensator having a negative optical anisotropy as shown in FIG. 2C cannot be obtained by a single optical medium, an optical compensator having an optical anisotropy equivalent to that of FIG. 2C can be obtained by combining two elements which have a positive optical anisotropy, as shown in FIG. 2D. Here, each element may be uniaxial or biaxial.

For example, one biaxial optical compensator 6 has the largest refractive index $n_y$ in y direction which is an in-plane direction of the substrate, and the other optical compensator 7 has the largest refractive index $n_x$ in x direction which is the other direction in the in-plane directions. Here, the refractive index in the other direction in the plane (i.e. $n_x$ of the compensator 6 and $n_y$ of the compensator 7) has an intermediate value. In this way, by orthogonally combining two optical compensators, each of which has the largest refractive index in one direction in the plane, an optical compensator having a negative optical anisotropy which has a uniformly large refractive index in the in-plane directions and a small refractive index in the direction perpendicular to the plane can be formed.

Although description has been made on the case where optical compensators having biaxial optical anisotropy are combined, it is also possible to combine two uniaxial optical compensators, each of which has a positive optical anisotropy (corresponding to the case of equal sign in the drawing).

Here, it is possible to perform substantial optical compensation even when there is a slight anisotropy in the in-plane directions. Further, when the homeotropic orientation has a small tilt angle, an optical compensator having a slight anisotropy in the in-plane directions becomes a more preferable compensator.

Conventionally, it has been difficult to obtain an appropriate optical material having such type of characteristics as shown in FIG. 2C. Thus, such compensators as polycarbonate sheet having a high refractive index in the stretched direction in the in-plane directions are used as the optical compensator of the type as shown in FIG. 2D.

Figure 3A:
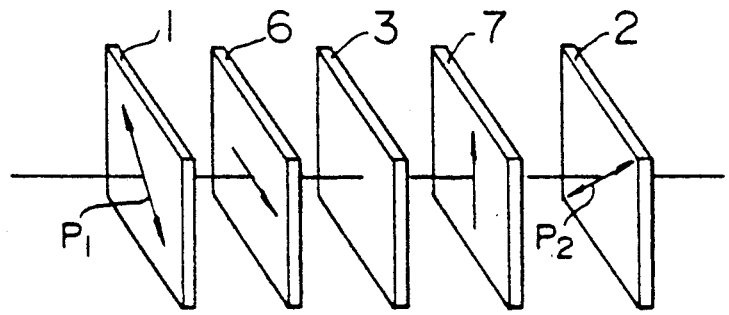
FIGS. 3A to 3C are diagrams for illustrating the prior art optical compensation.

In the case of polycarbonate sheet, when the sheet is stretched in one direction, the refractive index in the stretched direction becomes the maximum in all the directions, and the refractive indices in the remaining two directions becomes approximately equal. Such optical compensators are incorporated in the structure as shown in FIG. 3A. A pair of optical compensators 6 and 7 are disposed to have crossed stretched directions, sandwiching a liquid crystal cell 3. A pair of crossed polarizers 1 and 2 are disposed on the both outer sides of the structure.

Figure 3B:
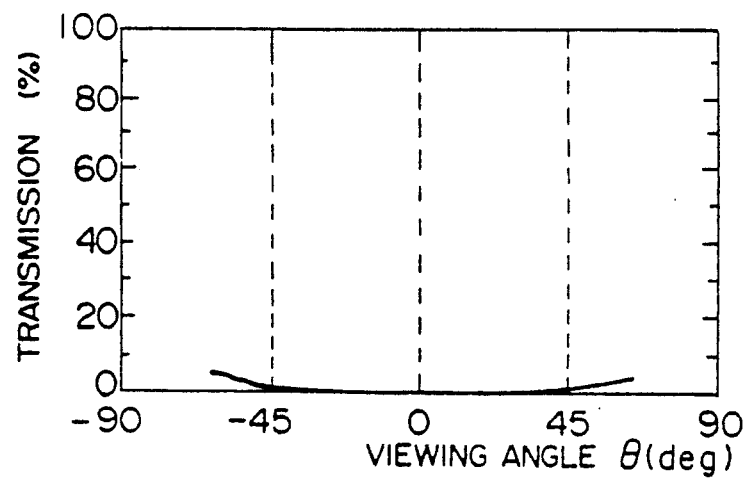

In the structure of FIG. 3A, the transmission in the orthogonal axial directions, which is the stretched directions of the optical compensators 6 and 7, becomes extremely improved as shown in FIG. 3B when the liquid crystal cell 3 takes homeotropic orientation.

However, when the viewing direction departs from the stretched directions (x and y directions), there gradually occurs leakage of light.

Figure 3C:
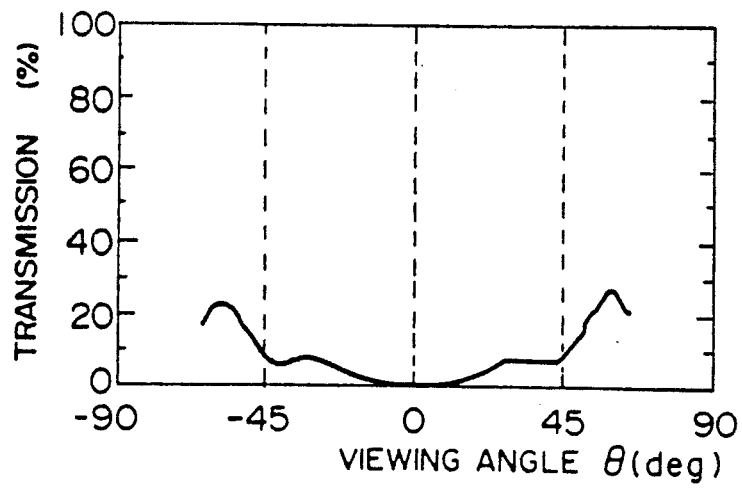

FIG. 3C is a graph showing transmission in the direction having an angle of 45 degrees from the orthogonal axes. As the viewing angle increases, transmission (leakage light) gradually increases to cause leakage light of 10% around 45 degrees and about 20% around 55 degrees. Here, the viewing angle is an angle measured from normal to the substrate.

Namely, there is obtained excellent optical compensating effect according to the direction of an observer, but the leakage light becomes large and the viewing angle becomes extremely small depending on the direction.

Hereinbelow, embodiments of forming an optical compensator utilizing ion containing polymer sheet will be described.

As the ion containing polymer, ionomer resin is preferable used. The ionomer has such a structure in that at least part of the carboxyl group of ethylene-unsaturated carboxylic acid copolymer is neutralized by metal ions. It may also include other unsaturated compound polymer unit. The unsaturated carboxylic acid in ethylene-unsaturated carboxylic aid copolymer working as a base polymer of the ionomer preferably has carbon numbers of 3 to 8. More specifically, acrylic acid, methacrylic acid, itaconic acid, maleic acid, monomethyl maleate ester, monoethyl maleate ester, etc. may be used. Among these, acrylic acid and methacrylic acid are especially preferable.

Other unsaturated compound polymer units which may be included in the above-mentioned copolymer as arbitrary components include unsaturated carboxylic acid ester and saturated carboxylic acid vinyl ester, etc. More specifically, methyl acrylate, ethyl acrylate, isobutyl acrylate, n-butyl acrylate, 2-ethylhexyl acrylate, methyl methacrylate, ethyl methacrylate, vinyl acetate, etc. may be included as the polymer unit.

Considering the transparency, melting point, mechanical strength, etc. of the ionomer, the compositions of the respective polymerization components in the ethylene-unsaturated carboxylic aid copolymer are preferably as follows. Composition of ethylene is preferably 50-98 weight % and more preferably 60-96 weight %. Composition of unsaturated carboxylic acid is preferably 2-35 weight %, and more preferably 5-30 weight %. Other unsaturated compounds are preferably 0-40 weight %, and more preferably 0-20 weight %.

The metal ion in the ionomer is preferably selected alkaline metal such as lithium, sodium, potassium, etc. alkaline earth metal such as magnesium, calcium, etc. and metals of valency of 1-3 such as zinc, aluminium, etc. Two or more kinds of these metal ions may be concurrently used. Among these, magnesium and alkaline metal are more preferable, and particularly magnesium is preferable. The neutralization by these metal ions is 1–100%, and preferably 10–80%.

It is preferable to use such ionomer that has a melt flow rate of 0.01–200 g/10 min., especially 0.1–50 g/10 min. at 190° C. and 2160 gram weight application.

These ionomer may also include other unsaturated compound polymer unit. The composition may be adjusted by directly neutralizing ethylene-unsaturated carboxylic aid copolymer, saponifing ethylene-unsaturated carboxylic aid ester copolymer, etc.

First, an optical compensation element is manufactured by using an ion containing polymer sheet made of an ionomer material called HI-MILAN available from Mitsui Du Pont Polychemical, Japan.

Figure 1A:
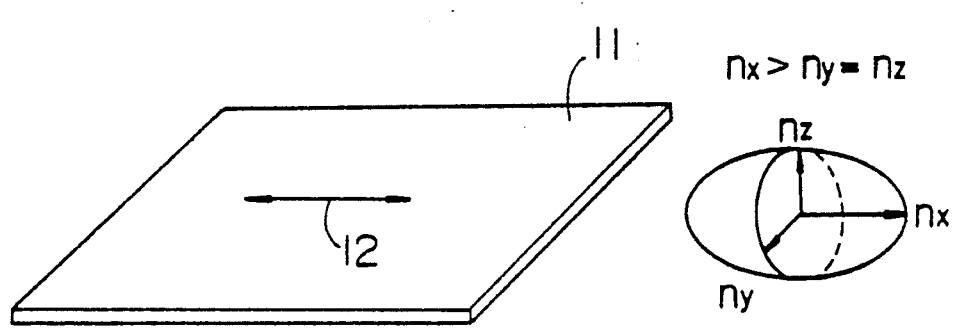
FIGS. 1A and 1B are schematic diagrams for illustrating a method of manufacturing an optical compensator sheet according to an embodiment of this invention.

An ion containing polymer sheet 11 made of HI-MILAN is stretched along one direction in the plane of sheet as shown in FIG. 1A. The stretched ion containing polymer sheet 11 becomes to have a refractive index $n_x$ along the stretching direction 12 larger than refractive indices in other directions. Such refractive index distribution is shown on the righthand side of the figure. The refractive indices $n_y$ and $n_z$ along the directions perpendicular to the stretching direction x have almost the same values. Namely, the ion containing polymer sheet 11 has a uniaxial optical anisotropy having the optical axis in a direction in the plane of sheet. This thickness of the ion containing polymer sheet can be adjusted in this step. It is preferable to adjust the thickness of the sheet within ±5% of a desired value.

Figure 1B:
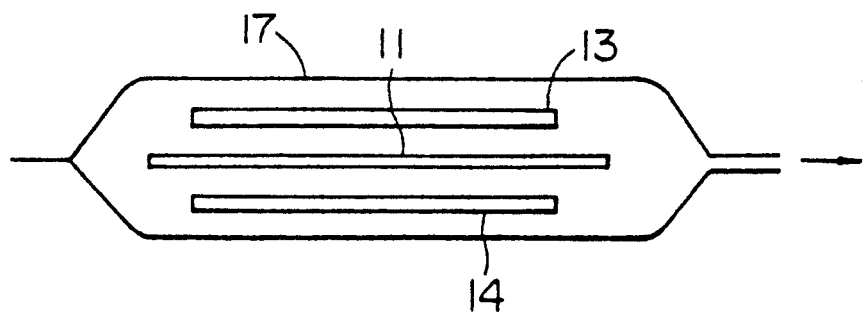

The ion containing polymer sheet 11, thus stretched is sandwiched between a pair of parallel glass plates 13 and 14 and contained in an evacuatable heat-resisting hermetic bag 17, as shown in FIG. 1B. The bag is then evacuated and sealed. The sealed bag is loaded in an autoclave furnace and subjected to heat and pressure application treatment.

After heat and pressure application treatment, the hermetic bag 17 is taken out from the autoclave furnace and cooled.

The refractive indices $n_x$, $n_y$ and $n_z$ of the ion containing polymer sheet vary gradually depending on the heating temperature, heating time, applied pressure, cooling condition, etc. of this treatment.

For example, when the ion containing polymer sheet made of HI-MILAN is treated at or above the melting point for a long time, a negative uniaxial optical anisotropy of $n_x = n_y > n_z$ will be exhibited.

Approximate values of the optical anisotropy $(n_x - n_z = \Delta n)$ obtained in the experiment for the cases of using various ionomer resins are listed in the following table. Here, as references, other elements were also manufactured using materials other than the ion containing polymer and through similar manufacturing process, and measured their characteristics. These references are also listed in the table.

In other experiment, AD7940 (trade name available from Mitsui Du Pont Polychemical) of Li ion type is treated in a similar manner and anisotropy $\Delta n$ of $0.9 \times 10^{-3}$ was obtained.

Comparing ionomers of Na ion type and Mg ion type, Na ion type ionomers have a tendency that ion species may remain as crystals in the sheet, and ionomers of Mg ion type are easier to handle. Except the materials of ion containing polymer, no negative optical anisotropy $n_x = n_y > n_z$ was obtained.

The value of optical anisotropy was especially high in HI-MILAN 1601 and HI-MILAN 1555.

From the viewpoint of transparency, HI-MILAN 1707 and HI-MILAN AM7311 were especially superior. HI-MILAN 1601 and HI-MILAN 1605 showed good results.

TABLE

| material | $\Delta n$ |
|---|---|
| HI-MILAN 1601 (Na ion type) | $-1.4 \times 10^{-3}$ |
| HI-MILAN 1605 (Na ion type) | $-0.9 \times 10^{-3}$ |
| HI-MILAN 1555 (Na ion type) | $-1.3 \times 10^{-3}$ |
| HI-MILAN 1707 (Na ion type) | $-0.9 \times 10^{-3}$ |
| HI-MILAN AM7311 (Mg ion type) | $-0.9 \times 10^{-3}$ |
| Polycarbonate | × |
| polystyrene | × |
| methyl methacrylate | × |
| Nucrel (Du Pont) | × |
| Esrec (Sekisui Chemical) | × |

As is apparent from the above embodiment, it is possible to obtain a negative optical anisotropy $n_x \simeq n_y > n_z$ having an optical axis perpendicular to the plane of sheet, by using ion containing polymer as the raw material and performing a predetermined treatment thereon. It is preferable to make $|(n_x - n_y)|/n_x \leq 0.01$. It is also found that anisotropy as shown in FIG. 1A changes continuously into the anisotropy as shown in FIG. 2C.

The above-mentioned characteristics were not found up till now in other polymer materials.

Among the ion containing polymers, resins formed by ion-bridging ethyl and methacrylic acid copolymer showed good results. Especially, HI-MILAN 1601 has a large value of $\Delta n$ and can reduce the thickness of the sheet when used as an optical compensator. HI-MILAN 1707 and HI-MILAN AM7311 have superior transparency, and enables high contrast when used in a liquid crystal display device.

Although description has been made on preferred embodiments of this invention, the present invention is not limited thereto. It will be apparent for those skilled in the art that various variations, alterations, substitutions, improvements, combinations, etc. are possible within the scope of this invention.

We claim:

1. A method of manufacturing an optical compensator sheet comprising the steps of:

stretching a sheet of ion-containing polymer along one direction in the plane of sheet, thereby generating an optical anisotropy having a high refractive index axis in the stretched direction;

sandwiching said sheet of ion-containing polymer between a pair of substrates; and applying heat and pressure to said sheet of ion-containing polymer, thereby reducing the in-plane optical anisotropy in said sheet of ion-containing polymer.

2. A method of manufacturing an optical compensation sheet according to claim 1, wherein said step of applying heat and pressure reduces the in-plane optical anisotropy in said sheet of ion-containing polymer not higher than 1%.

3. A method of manufacturing an optical compensation sheet according to claim 1, wherein said step of applying heat and pressure includes raising the temperature of said sheet not less than the melting point of the sheet.

4. A method of manufacturing an optical compensator sheet according to claim 1, wherein said step of applying heat and pressure includes loading said sandwiched structure in an autoclave furnace in a sealed state.

5. A method of manufacturing an optical compensator sheet according to claim 1, wherein said ion-containing polymer includes ionomer.

6. A method of manufacturing an optical compensator sheet according to claim 5, wherein said ionomer contains copolymers of ethylene and methacrylic acid bridged with metal ions.

7. A method of manufacturing an optical compensator sheet according to claim 6, wherein said metal ions include at least one species selected from the group consisting of sodium ion, magnesium ion, zinc ion, lithium ion, aluminium ion, and their mixtures.

8. A method of manufacturing an optical compensator sheet comprising the steps of:

providing a sheet of ionomer, which ionomer is bridged with sodium or magnesium ions;

stretching said sheet of ionomer along one direction in the plane of sheet, so as to generate uni-axial optical anisotropy of predetermined amount having an optical axis along the stretched direction;

sandwiching said stretched sheet of ionomer between a pair of substrates;

putting said sandwiched sheet in an evacuatable heat-resisting bag;

evacuating and sealing said bag;

loading said bag in an autoclave furnace; and applying heat and pressure to said sheet in said autoclave furnace at a temperature not less than the melting point of the sheet.

9. An optical compensator mainly formed of an ion-containing polymer, shaped in a sheet, and having a refractive index in the direction perpendicular to the plane of sheet smaller than refractive indices in directions in the plane of sheet, said optical compensator prepared by stretching said sheet of ion-containing polymer in one direction in the plane of the sheet thereby generating an optical anisotropy having a high refractive index in the stretched direction.

10. An optical compensator according to claim 9, wherein said ion-containing polymer includes ionomer.

11. An optical compensator according to claim 10, wherein said ionomer contains copolymers of ethylene and methacrylic acid bridged with metal ions.

12. An optical compensator according to claim 11, wherein said metal ions include at least one species selected from the group consisting of sodium ion, magnesium ion, zinc ion, lithium ion, aluminium ion, and their mixtures.

* * * * *